G. LILLIBRIDGE.
Chests for Teas, Coffees, &c.
No. 147,661.
Patented Feb. 17, 1874.
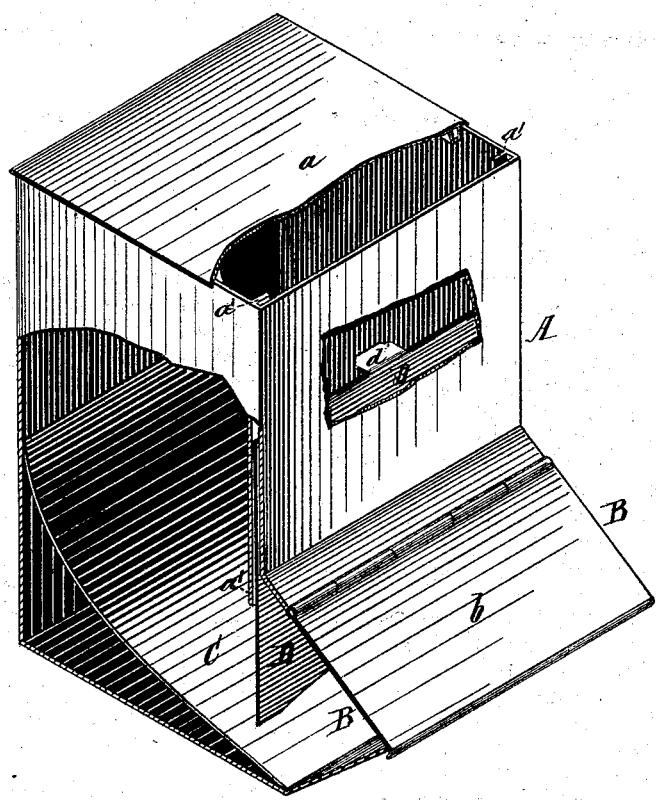
Witnesses:
G. Mathys.
Solon C. Kemon
Inventor:
Geo. Lillibridge
Per
Attorneys.

UNITED STATES PATENT OFFICE.

GEORGE LILLIBRIDGE, OF LITTLE COOLEY, PENNSYLVANIA.

IMPROVEMENT IN CHESTS FOR TEAS, COFFEES, &c.

Specification forming part of Letters Patent No. 147,661, dated February 17, 1874; application filed December 1, 1873.

*To all whom it may concern:*

Be it known that I, GEORGE LILLIBRIDGE, of Little Cooley, in the county of Crawford and State of Pennsylvania, have invented a new and Improved Chest for Tea, Coffee, Rice, &c.; and I do hereby declare that the following is a full, clear, and exact description of the same, reference being had to the accompanying drawing forming a part of this specification, in which the figure is a perspective view with parts broken out.

The invention is an improvement in self-feeding tea and coffee chests or canisters, and relates to a vertical slide, which is cut out at the bottom, in combination with the inclined bottom of the chest and an outer trough or receptacle, as hereinafter fully set forth.

The chest A has a suitable cover, B, and a front trough or receptacle provided with a hinged cover, $b$. C is a false bottom, which is concave or inclined forward toward the trough. D is a vertical plate, having a thumb-piece, $d$, and arranged to slide in guides $a\ a$, as will be readily understood from the drawing. The lower edge of the slide D is cut out on the arc of a circle, so that a space always exists between said edge and the inclined bottom of the chest.

By this construction, whatever be the quantity of tea, coffee, or rice in the chest, it will continue to feed into the trough till no more is left, and will be there conveniently accessible, so as to be readily removed by a scoop or other device; yet the air and dust are excluded by the cover from the portion thus fed into the trough as effectually as from that within the chest proper.

The opening formed by cutting out the bottom of the slide D, in conjunction with the inclined bottom C, insures the presence of a quantity of the tea or other article in the trough, and such form of slide also enables it to be raised when freer delivery is desired; and it is less expedient to raise the cover B and adjust the slide by the projection $d$. To thus raise the slide, any suitable means or instrument may be employed—most conveniently, the scoop used in the trough.

What I claim as the improvement is—

The chest or canister having the vertical slide D, with curved lower edge, the inclined false bottom, and the trough or outer receptacle, combined substantially as shown and described.

GEORGE LILLIBRIDGE.

Witnesses:
 G. D. HEATH,
 C. T. HAMILTON.